March 19, 1957  C. E. FRUDDEN  2,785,523
COTTON PICKING SPINDLE AND SLAT ASSEMBLY
Filed June 18, 1954
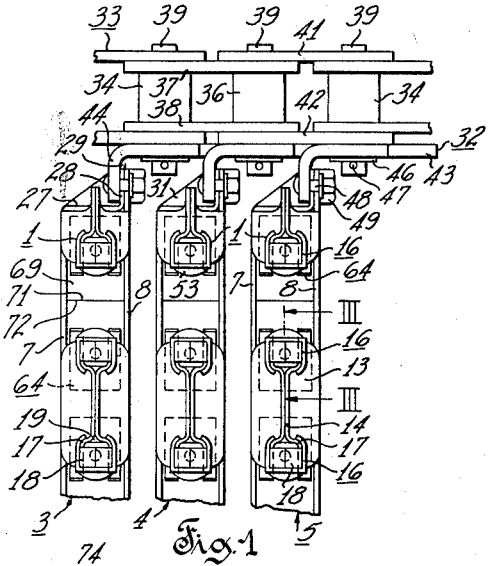
Fig. 1
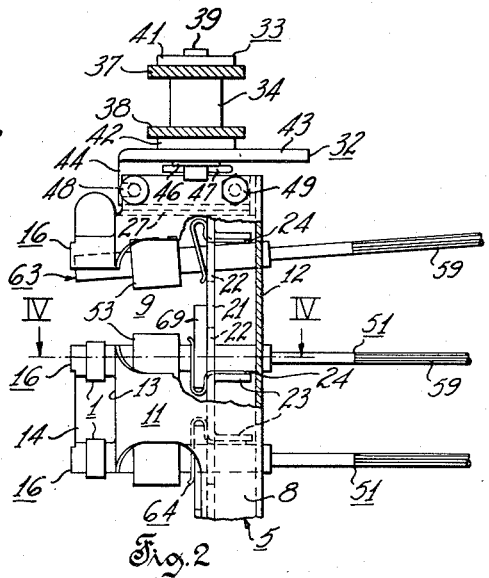
Fig. 2
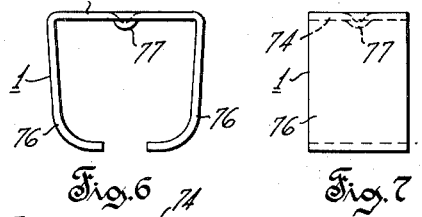
Fig. 6  Fig. 7
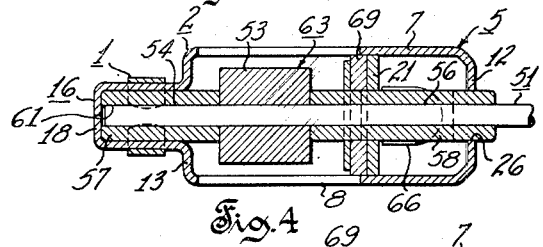
Fig. 4
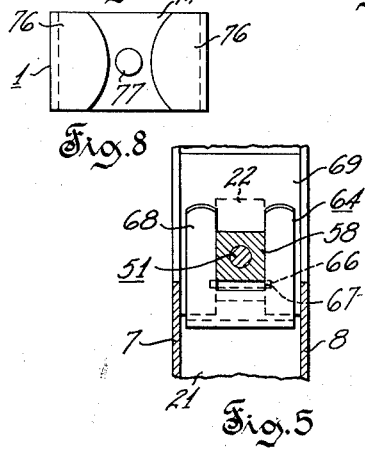
Fig. 8
Fig. 5
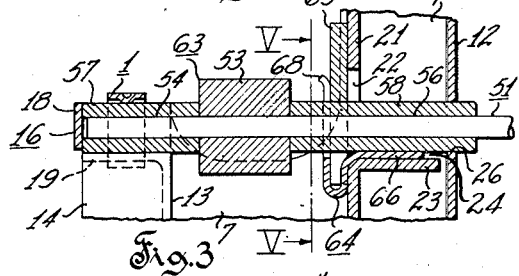
Fig. 3
Fig. 12  Fig. 11
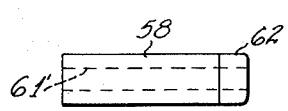
Fig. 9
Fig. 10
Inventor
Conrad E. Frudden
by W. Jurold
Attorney

United States Patent Office 2,785,523
Patented Mar. 19, 1957

2,785,523

COTTON PICKING SPINDLE AND SLAT ASSEMBLY

Conrad E. Frudden, Wauwatosa, Wis., assignor to Allis-Chalmers Manufacturing Company, Milwaukee, Wis.

Application June 18, 1954, Serial No. 437,693

5 Claims. (Cl. 56—42)

This invention relates to cotton harvesters, and it is concerned more particularly with an improved picking mechanism of the rotary spindle type.

Cotton harvesters of the rotary spindle type have heretofore been suggested wherein the spindles are mounted on vertical slats so as to extend horizontally therefrom, and wherein a series of such slats are moved in an oblong path to present the spindles in picking condition while they move along one side of the path, and to present the spindles in stripping condition while they move along the other side of the oblong path. Details of such a machine, and particularly of the slats and spindle mountings as heretofore used, are disclosed, for instance, in U. S. 2,671,298, issued March 9, 1954, to R. C. Fergason for Cotton Picker.

Generally, it is an object of the present invention to provide an improved spindle slat assembly for use in machines of the hereinabove outlined character.

More specifically, it is an object of this invention to provide an improved spindle slat assembly for cotton pickers, wherein bearing blocks for the spindles are pocketed in the slat and releasably retained in place, the construction being such that the spindles may readily be removed individually for purposes of replacement or repair and yet are securely locked in an accurately adjusted position on the slat during normal operation of the picking mechanism.

A further object of the invention is to secure bearing blocks of a spindle slat assembly against accidental displacement by means of a removable retainer which is extremely simple and compact in construction, efficient in operation, and which may be manufactured at a minimum of cost.

The foregoing and other objects and advantages are attained by the present invention, various novel features of which will become apparent from the description herein of a preferred embodiment of the invention, and will be set forth in the appended claims.

Referring to the drawings:

Fig. 1 is an elevational view of part of a picking unit incorporating the upper portions of vertical spindle slats and an upper slat carrying chain;

Fig. 2 is a side elevation of one of the slats and associated parts shown in Fig. 1, some parts being broken away and shown in section and with one spindle assembly being shown in a position of partial installation;

Fig. 3 is an enlarged sectional view taken on line III—III of Fig. 1 showing in elevation the mounting of the spindle assembly with a portion of the spindle omitted;

Fig. 4 is an enlarged sectional view taken on line IV—IV of Fig. 2 showing in plan the mounting of the spindle assembly;

Fig. 5 is a sectional view taken on line V—V of Fig. 3 showing the mounting of one of the bearing blocks;

Fig. 6 is an enlarged front elevational view of a retaining means incorporated in the slat structure of Fig. 1;

Fig. 7 is a side elevational view of the retaining means shown in Fig. 6;

Fig. 8 is a plan view of the retaining means shown in Fig. 6;

Fig. 9 is an enlarged plan view of a bearing block incorporated in the slat structure shown in Fig. 2;

Fig. 10 is an end view of the bearing block shown in Fig. 9;

Fig. 11 is an elevational view of one of the bearing pockets showing a modified form of the retaining means shown in Fig. 7;

Fig. 12 is an end view of the structure shown in Fig. 11.

Referring to Figs. 1 and 2, the snap ring retainer structure 1 of the present invention is shown in its installed condition on the bearing pockets of each of the three vertically disposed spindle carrying slats generally designated by the reference characters 3, 4 and 5, respectively. As shown in the sectional view of Fig. 4 a sheet metal structure forms the body 2 of each slat and comprises horizontally opposite relatively wide vertical side walls 7 and 8. As best shown in Fig. 2 the side wall 8 is irregularly shaped along one edge to provide a vertical series of deep recesses 9 separated by peninsular parts 11 and side wall 7, which is horizontally opposite from the side wall 8, is of identical configuration with the recesses 9 of each side wall being in horizontal alignment with each other. The side walls 7 and 8 are formed integral with a convex outer cross wall 12 which is relatively narrow and which extends longitudinally of the slat 5 along the edges of the walls 7 and 8 which do not contain the recesses 9. The other or inner end cross wall is formed by the side walls 7 and 8 of peninsular parts 11 being turned in toward each other at right angles. When the inturned side walls 7 and 8 meet they are given another right angle bend and thus placed in face to face engagement with each other as best shown in Fig. 1 and are rigidly secured together as by spot welding thus forming inner cross wall 13 (Figs. 1 and 2) and an inner projecting web 14. The web projecting from inner cross wall 13 (Fig. 1) contains two thicknesses of sheet metal, each thickness being an extension of one of the side walls 7 and 8 of the slat structure 5. Reference character 16 designates the rectangular box like inner bearing block pocket or compartment which is formed by stamping opposite hand right angled portions 17 (Fig. 1) out of each thickness of sheet metal which forms web 14. Small tab like projections 18 as best seen in Fig. 1 which originally projected outwardly from web 14 are bent inward at right angles toward each other to form a rear or inner end for each of the end bearing block pockets 16. This construction provides either side of each peninsular part 11 with a pair of bearing block pockets 16 with each pocket having a side opening for accommodating movement of a bearing transversely of its axis into and out of the pocket as will be more fully explained below. The closed side 19 of bearing pockets 16, that is, the side opposite the open side is formed by the opposite angled portions 17 and it will be further noted that the two bearing pockets of each peninsular portion are separated by the narrow web 14.

A spacing and outer bearing mounting strip 21 (Figs. 2 and 3) is placed edgewise between side walls 7 and 8 and is rigidly secured therein by suitable means (not shown). The spacing strip 21 is provided with a longitudinally extending series of spaced rectangular apertures 22 (Fig. 3) which are formed by portions 23 being struck out and bent over at a right angle to the plane of strip 21 to provide an outer bearing receiving and positioning compartment or pocket 24. With reference to Fig. 2 it will be noted that the struck out portions 23 are bent horizontally outward from opposite edges of adjacent rectangular openings 22. In this connection it should also be noted that the strike out tabs 23 are located in pairs with relation to recesses 9 in the slat walls. Tabs 23 of adjacent openings 22 are bent from opposite edges of the openings 22 so that the tabs are located in the same plane horizontally opposite from closed wall 19 of inner bearing pocket 16. In the installed position in the slat the tabs 23 serve as a recessed mounting support for an intermediate spindle bearing block in a manner which will be more fully explained hereinbelow. The rectangular apertures 22 as seen in Fig. 3 are in horizontal alignment with a vertically spaced series of circular apertures 26 provided in outer convex cross wall 12.

In other words, side walls 7 and 8, spacing strip 21 and tabs 23 constitute additional wall portions which co-act with outer cross wall 12 to form longitudinally spaced wall structures which extend inwardly from the portions of outer wall 12 including the circular openings 26 and provide pairs of open sided outer and inner bearing receiving and positioning compartments 24 and 16, respectively. Each pair of compartments 24 and 16 is in general alignment with a rectangular aperture 22 which is in turn aligned with a circular aperture 26.

As shown in Fig. 1 the upper portion of side wall 7 is bent inward at right angles toward side wall 8 and thereby forms a top wall 27 for the slat structure 5. Side wall 8 extends straight up past top wall 27 and is rigidly connected with a vertical extension 28 of top wall 27 which is now in face to face engagement with side wall 8 thus forming an upper mounting flange 29 of double thickness. A triangular brace 31 formed integral with convex cross wall 12 connects side wall 7 with the top edge of flange 29. The vertical mounting flange 29 at the top of the slat serves to secure the slat to a hinge structure 32 and will be more fully explained below.

The construction of the upper end of the slat 5 is duplicated exactly at the lower end of the slat which is thus provided with a lower mounting flange (not shown) identical in structure to the upper flange 29.

It will be understood that slats 3, 4 and 5 are part of an endless series of slats which are moved in an oblong path about a suitably constructed support (not shown). The mechanism for moving the slat is of conventional construction and includes an endless upper chain, part of which is shown at the top of Figs. 1 and 2 and generally indicated by reference character 33, and an endless lower chain (not shown). The upper and lower chains are trained about vertically spaced sprocket wheels (not shown) at one end of an oblong path of slat movement and about a pair of vertically spaced guide wheels or idlers (not shown) at the other end of such oblong path. The spindle carrying slats extend vertically between upper and lower chains and each slat has an upper pivot connection with the upper chain and a coaxial lower pivot connection with the lower chain.

As best shown in Figs. 1 and 2, the upper chain 33 is of conventional construction in that it is made up of a series of links each comprising a pair of bushings 34 and 36 and a pair of side plates 37 and 38 which rigidly secure the bushings of each link in parallel spaced relation to each other. Rotatably mounted in each bushing is a pivot pin 39, and each link comprising one pair of bushings 34, 36 and one pair of side plates 37, 38 is flexibly connected with the next link by upper and lower side plates 41 and 42 which are attached at their longitudinally opposite ends to adjacent pairs of chain pivots 39. The pivots 39 are rigidly secured at their upper ends, as by riveting, to the upper side plates 41. The axial length of each chain pivot 39 is appreciably greater than the vertical distance between the outer sides of the side plates 41 and 42, so that all of the pivots 39 will project a substantial distance downwardly beyond the lower side plates 42, as shown in Figs. 1 and 2.

The reference character 32 in Figs. 1 and 2 generally designates a hinge bracket which is detachably secured to the upwardly extending flange 29 at the upper end of slat 5 and which serves to pivotally connect the slat 5 at its upper end to the upper chain 33. The hinge bracket 32 is made of relatively heavy gauge plate metal and comprises horizontal portion 43 (Fig. 1) and a downwardly extending flange portion 44. The lower end portion of chain pivot 39 which is located between slats 4 and 5 extends downwardly through a circular aperture in the horizontal portion 43. The aperture is accurately finished, as by reaming for a close running fit on chain pivot 39, and the hinge 32 is retained on the pivot 39 by means of a washer 46 and a cotter pin 47 which is inserted through a hole in the chain pivot 39 below the washer.

The detachable connection between the slat 5 and the flange 44 of upper hinge 32 comprises a stud 48 which is fixedly secured to depending flange 44 as by riveting and a cap screw 49 which extends through a hole in the upwardly extending flange of slat 5 and is threaded into a tapped hole of the flange 44.

The foregoing description of the connection between the upper end of slat 5 and chain 33 similarly applies to the upper connection of all slats and it is to be understood that the lower connection of each slat to the lower chain is accomplished in a like manner.

In passing about the oblong path the slat structures are carried through a suitable spindle drive assembly (not shown). The spindle drive assembly is provided with driving rails which are spring biased into frictional engagement with the cylindrical drive rollers of the spindles. This drive assembly is positioned along only one side, that is, the picking side of the oblong path, thus it is operative to rotate the cotton picking spindles 51 only as the slat is passing through the picking side of the path of slat travel.

Located on the other or opposite side of the path is a stripping assembly of conventional construction through which the spindles pass. In operation through both of the above mechanisms the spindles and slats must be accurately aligned vertically to assure proper functioning and to prevent damage to the mechanism which would be caused by misalignment.

The cotton picking spindle 51 shown in Figs. 2 and 4 has an axially extending picking portion 59, an intermediate journal portion 56 and an end journal portion 54 in axial alignment with intermediate journal portion 56 at the side of the latter remote from the picking portion 59. The spindle assembly is completed by a drive roller 53 nonrotatably secured to picking spindle 51 between journal portions 54 and 56.

The spindle 51 is rotatably supported in the slat body 2 by means of inner and outer bearing blocks 57 and 58. Outer bearing block 58 surrounding intermediate journal portion 56 and another or inner bearing block 57 surrounding end journal portion 54. These bearing blocks have a square cross sectional configuration and are provided with circular apertures 61 and 61', respectively (Figs. 4, 9 and 10) passing through the longitudinal extent thereof which is substantially equal in diameter to the diameter of the picking portion 59. The outer bearing block 58 has a forward portion 62 of cylindrical configuration (see Figs. 9 and 10) and the diameter of the cylindrical portion 62 on the forward end of the outer bearing is equal to the cross sectional width of the bearing block 58. The outer bearing 58 is placed in operative condition on the spindle 51 by passing the active or picking portion 59 through the circular hole 61' with the forward cylindrical portion 62 facing outward, that is, toward the picking portion 59 of the spindle. The inner bearing block 57 is inserted over the opposite or inner end of the spindle in a similar manner and it will be seen by reference to Figs. 3 and 4 that the inner and outer bearing blocks straddle the drive roller 53.

The spindle assembly 63 comprising the picking spindle 51, the drive roller 53 and the inner and outer bearings 57 and 58 installed thereon is shown in a partially installed position in Fig. 2. Referring to Fig. 5 it will be seen that a locking spring element 64 is shown in its installed condition. The locking spring element 64 consists of a tab portion 66 of greater width than the short dimension of rectangular aperture 22, a neck portion 67 of equal width to the short dimension of rectangular aperture 22 and a bifurcated portion 68 presenting a pair of legs extending generally at a right angle to tab portion 66 when installed in operating position. This installation is accomplished by inserting tab 66 into rectangular aperture 22 with the flat surface of tab portion 66 extending parallel to the longitudinal extent of the aperture 22. The locking spring element 64 is then rotated 90° until the flat surface of tab 66 is resting against turned over portion 23 in the position shown in Fig. 3 and the neck portion 67 is engaging the adjacent opposite edge portions of the longer or longitudinal sides of aperture 22. After locking spring 64 is installed in this position the spindle assembly 63 is positioned at a slightly greater angle than that seen in Fig. 2 and moved toward the aperture 22 in spacing strip 21 and the aligned aperture 26 in outer slat wall 12, the picking portion 59 of the spindle first passing between the legs of the bifurcated portion 68 of the locking spring 64, then through one of the rectangular apertures 22 and then through the transversely registering hole 26 contained in the convex outer wall 12 of the slat structure 5. This movement continues until the cylindrical forward portion 62 of intermediate bearing block 58 enters aperture 26. This positions the inner and outer bearings in the slat body but at a somewhat laterally opposite position of their operative positions in the inner and outer compartments. It is to be noted that aperture 26 is of such diameter as to receive cylindrical spindle bearing block portion 62 but is too small to receive square spindle bearing block portion 58 thereby limiting the extent to which the spindle assembly can be inserted into the slat structure 5. The spindle assembly is then pushed laterally upward to the position shown in Fig. 2. The slat body 2 having pocket 16 therein with a side opening for accommodating movement of end bearing block 57 laterally or transversely of its axis into pocket 16.

A wear strip or lock plate 69 best seen in Figs. 1 and 3 has a square portion cut out of one end thereof to provide an opening complementary to the square cross sectional configuration of the outer bearing block 58. This locking member is slid longitudinally along spacing member 21 under spring legs 68 until the edges defining the opening are in contiguous encompassing relation with three sides of outer bearing 58. In this installed condition the side edges of the locking plate or wear strip 69 are in engagement with the inner side surfaces of slat side walls 7 and 8 thus preventing any lateral or side movement of the wear strip. In this connection it will also be noted that the locking strips are maintained against longitudinal movement relative to the slat by the opposed abutting engagement of edges 71 and 72 of adjacent locking strips. As will be noted by reference to Fig. 3 the locking strips are securely maintained against the spacing strip 21 by the action of spring legs 68 of locking clips 64. It will be understood that each spindle assembly 63 is similarly inserted in the slat body 2 and retained therein in the same manner as is the spindle assembly just described.

Again referring to Fig. 3, it is seen that tabs 23 and inner bearing pocket wall 19 support outer and inner bearing blocks 58 and 57, respectively, thereby limiting movement of the spindle assembly 63 in one direction longitudinally of the slat structure. Locking strip member 69 prevents movement of the spindle assembly in the opposite direction as also does the coaction between the cylindrical bearing portion 62 and the surrounding edge of circular apertures 26 which are of substantially the same size as forward bearing portions 62. In addition movement of the intermediate bearing blocks to the right as viewed in Fig. 4 is prevented because as previously indicated the square cross section portion of outer bearing block 58 cannot pass through the circular hole 26. Further movement of the spindle assembly in the opposite direction, that is, toward the left as viewed in Fig. 4 is prevented by the outer end of end bearing block 57 engaging the turned over end portions 18 of the bearing pocket 16.

It is readily apparent by reference to Fig. 1 that the coaction between the abutting edges 71 and 72 of the adjacent locking plates 69 serve to keep the plates in position and in turn their engagement with bearing blocks 58 serving to keep the longitudinal axis of the spindle at right angles to the longitudinal axis of the slat body 2. Should the lock spring 64 break because of fatigue or other reasons it would permit locking plate 69 to fall from its installed position as viewed in Fig. 3 which in turn would permit the spindle assembly 63 to drop or tip to a position similar to the one shown in Fig. 2. In this position there would be insufficient space between the cylindrical drive rollers of adjacent spindle assemblies to permit the slat to pass through the spindle drive assembly above described. As a result the spindle assembly 63 would engage the spindle drive assembly and cause extensive damage to the picking unit.

To prevent the spindle tilting or dropping when either the locking spring 64 or locking plate 69 is broken, lost or worn out a simple but effective arcuate radially contractable and expandable retainer element is used which is generally designated by the reference character 1 in Fig. 6. The retainer element or snap ring 1 is mounted on the slat body in embracing relation to pocket 16 and inner bearing block 57 so as to secure the latter against transverse outward movement from pocket 16. The arcuate retainer element 1 is formed by a generally C-shaped sheet metal spring clip having a bight portion 74 in confronting relation to said side portion of pocket 16 when retainer element 1 is in an installed position. Leg portions 76 are formed integral with bight portion 74 and when in an installed position the leg portions 76 are in straddling or clamping engagement with slat body 2. It will be noted by reference to Figs. 6, 7 and 8 that the bight portion 74 is extruded to form a tip 77 which is in contact with inner bearing block 57.

Referring again to Fig. 6 it will be noted that the leg portions 76 of the snap ring 1, in being turned in at an acute angle to bight portion 74, are automatically tensioned because in inserting the snap ring 1 over the rear bearing pocket 16, the angled legs must expand, that is, they are forced apart as installation takes place thus giving a close interference fit with the sides of the bearing pocket 16. This interference fit serves to keep the snap type retaining ring 1 from slipping off of the pocket 16. The extruded tip 77 provided in the bight portion 74 of the snap ring 1 is designed to engage the exposed side of the inner spindle bearing block 57 thus keeping the bearing positioned snugly within the pocket 16. This tip 77 serves to reduce the possibility of play between the inner sides of the bearing pocket and the bearing 57 which may result from manufacturing tolerances. In addition the tip 77 tends to embed itself slightly in the surface of the bearing due to slight downward movement of the center of bight portion 74 which takes place when the leg portions are forced apart in the installation process. It will be noted that this action additionally secures retainer 1 in position.

A modified form of the snap ring retainer is designated by the reference character 1' and is shown in an installed position in Figs. 11 and 12.

In the modified embodiment the retainer 1' is formed out of spring steel wire and formed into a C-shaped configuration. The legs 76' have their free ends 78 turned back upon themselves thus forming semicircular portions 79.

The modified retainer is installed in a similar manner with the circular portion in embracing relation to pocket 16 and bearing block 57 thus securing the latter against movement from pocket 16. It will be understood that the bearing 57 and pocket 16 are identical in construction in both modifications expect that the free edges of pocket 16 are provided with a pair of transversely aligned slots 81 when the modified retainer 1' is used. Slots 81 are of a width slightly in excess of the thickness of the wire used in manufacture of the modified retainer 1. In installing the retainer it is placed in embracing relation to pocket 16 and moved to the right as shown in Fig. 11 until the legs 76' reside in slots 81. The slots are sufficiently deep to allow legs 76' to grip the corner portions of bearing 57, thus holding it snugly in position. Slots 81 further prevent retainer 1 from being dislodged during the picking operation.

In operation the retaining ring serves not only to position the inner spindle bearing properly within its pocket to prevent undue play between the sides of the pocket and the bearing, but it also functions as a safety device securing the spindle in a right angled position relative to the slat structure and insures that the spindle will not drop down as above pointed out and destructively contact other parts of the picking mechanism. It should be noted that the snap ring may be installed with the simplest of tools and in most instances it may be installed or removed without the use of any tools whatsoever, the strength of the fingers being sufficient.

It is to be understood that it is not desired to limit the invention to the particular features in details described hereinabove and that the invention is to be considered as including such other forms and modifications as are fairly embraced in the scope of the appended claims.

It is claimed and desired to secure by Letters Patent:

1. In an elongated cotton picker slat mounting a series of longitudinally spaced picking spindles, a slat body comprising an outer wall provided with a longitudinal series of spaced spindle receiving openings extending therethrough, and comprising additional wall portions coacting with said outer wall to form an inseparable unitary structure presenting longitudinally spaced wall structures extending inwardly from portions of said outer wall including said openings with said wall structures providing at least one pair of open sided outer and inner bearing receiving and positioning compartments with the compartments of each pair spaced apart in alignment with an opening in said outer wall, a picking spindle operatively associated with each of said openings of said outer wall and comprising a picking portion projecting through said opening in said outer wall, an outer bearing disposed in said outer compartment, a drive roller adjacent the inner end of said outer bearing and disposed in the space between said outer and inner compartments, and an inner bearing adjacent the inner end of said drive roller and disposed in said inner compartment, said spindles being individually and operatively positionable in said body by inserting said picking portion of each spindle through one of said openings in said outer wall with its said bearings positioned in the pair of compartments aligned with said one opening and with its drive roller disposed in the space therebetween as aforesaid, and a bearing retaining element detachably engaging additional wall portions of said body disposed in adjacent relation to said inner compartment with a part of said element bridging said open side of said inner compartment and embracingly retaining the inner bearing disposed therein.

2. In an elongated cotton picker slat mounting a series of longitudinally spaced picking spindles, a slat body comprising an outer wall provided with a longitudinal series of spaced spindle receiving openings extending therethrough, and comprising additional wall portions coacting with said outer wall to form an inseparable unitary slat structure presenting longitudinally spaced wall structures extending inwardly from portions of said outer wall including said openings with said wall structures providing at least one pair of open sided outer and inner bearing receiving and positioning compartments with the compartments of said pair spaced apart in alignment with an opening in said outer wall, picking spindle assemblies operatively associated with each of said openings in said outer wall and comprising a picking portion projecting through said opening in said outer wall, an outer bearing disposed in said outer compartment, a drive roller adjacent the inner end of said outer bearing and disposed in the space between said outer and inner compartments, and an inner bearing adjacent the inner end of said drive roller and disposed in said inner compartment, said spindle assemblies being individually and removably operatively positioned in said body by inserting each assembly at an angle into said body with its picking portion extending through one of said openings in said outer wall and with its said inner and outer bearings positioned laterally opposite the pair of said inner and outer compartments provided within the one of said wall structures extending inwardly of said one opening, and by then moving said assembly toward said one wall structure thereby positioning said inner and outer bearings within the said inner and outer bearing receiving compartments provided in said one wall structure, and a bearing retaining element detachably mounted on said one wall structure in adjacent bridging relation to said open side of said inner compartment and embracingly retaining the inner bearing disposed therein.

3. In a cotton picker slat, the combination set forth in claim 2, wherein said retaining element comprises an arcuate radially contractible and expansible element of generally C-shaped configuration positionable in straddling engagement with said compartment of said slat body.

4. In a cotton picker slat, the combination set forth in claim 2, wherein said retaining element is formed by a sheet metal spring clip having a bight portion in confronting relation to said opening of said compartment and leg portions in embracing engagement with wall portions of said slat body forming said inner compartment.

5. In a cotton picker slat, the combination set forth in claim 4, wherein said bight portion of said spring clip is extruded to form a tip in contact with said inner bearing block.

References Cited in the file of this patent

UNITED STATES PATENTS

| | | |
|---|---|---|
| 2,440,450 | Rust | Apr. 27, 1948 |
| 2,548,069 | Rust | Apr. 10, 1951 |
| 2,665,536 | Rust | Jan. 12, 1954 |
| 2,668,409 | Bramblett | Feb. 9, 1954 |